April 30, 1935.  I. H. GOODMAN  1,999,808

VALVE

Filed April 7, 1933  2 Sheets-Sheet 1

INVENTOR.
Isaac H. Goodman

BY Lancaster, Allwine and Rommel
ATTORNEYS.

April 30, 1935.  I. H. GOODMAN  1,999,808

VALVE

Filed April 7, 1933  2 Sheets-Sheet 2

INVENTOR.

Isaac H. Goodman

BY Lancaster, Allwine & Rommel
ATTORNEYS.

Patented Apr. 30, 1935

1,999,808

UNITED STATES PATENT OFFICE 1,999,808

VALVE

Isaac H. Goodman, Pampa, Tex., assignor to Phillips Petroleum Company, Bartlesville, Okla., a corporation of Delaware Application April 7, 1933, Serial No. 664,986

5 Claims. (Cl. 251—89)

This invention relates to valves and more particularly to a multiple-port valve.

The principal object of the invention is to provide a novel valve particularly applicable for association with a diaphragm motor valve and a float to control the flow of a fluid through the diaphragm motor valve.

However, another object is to provide a unitary valve which may be employed as above or to operate, for instance, the steam valve of a steam pump which is adapted to hold a constant fluid level.

Another object is to provide such a valve which is readily adjustable so that the ports thereof are not wholly open nor closed, or which may be adjusted so that these ports may be wholly open or closed, as when pumping out pump line run tanks or sump pits, where it is necessary to close the valve when the tank or pit is empty or full, as the case may be.

Still another object is to provide a rotary disc valve which is adapted to control the flow of residual gas from oil distillating operations, so that the pressure of this control flow of gas will act upon a second piece of apparatus.

Another object is to provide a pistonless valve for the purposes mentioned and one which will not freeze.

Another object is to provide an improved valve for association with a float or the like, which valve is so constructed that operation thereof will result from a very slight movement of the float.

Yet another object is to provide a disc valve wherein novel means is provided for the proper seating thereof.

Another object is to provide a valve of this kind comprising but a few parts,—in fact, but two operating parts, and a valve which will not be apt to get out of order nor require frequent attention.

Other objects and advantages of the invention will be apparent during the course of the following detailed description, taken in connection with the accompanying drawings, forming a part of this specification and in which drawings:—

Figure 1:
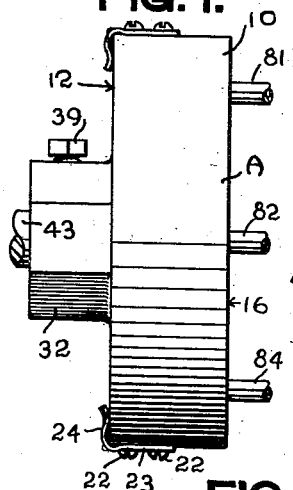
Figure 1 is an elevation of the improved valve assembly.

In the drawings, wherein for the purpose of illustration is shown only a preferred embodiment of the invention, and wherein similar reference characters designate corresponding parts throughout the several views, the letter A designates generally the improved valve, B a float assembly to which the improved valve may be attached, C a receptacle such as a tank, having communication with the float assembly B, D a diaphragm motor valve, E a pipe line between C and D and F conduits to and from the valve A.

The improved valve A includes a casing, preferably comprising a disc 10 of suitable material having an annular valve seat 11 in one face 12 with the surfaces 13 of the side walls of the seat substantially perpendicular to the flat base 14 of the seat 11. An annular bore 15 extends through the disc 10 from the opposite face 16 and an annular collar 17 extends into the seat 11 continuing this bore 15 to substantially the plane of the face 12 of the disc.

Figure 2:
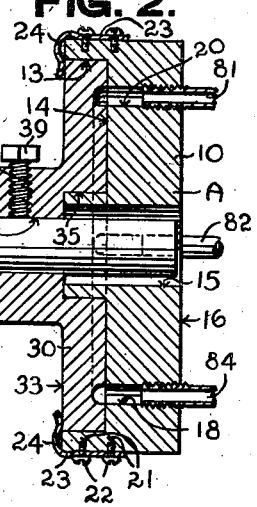
Figure 2 is a vertical section thereof.
Figure 3:
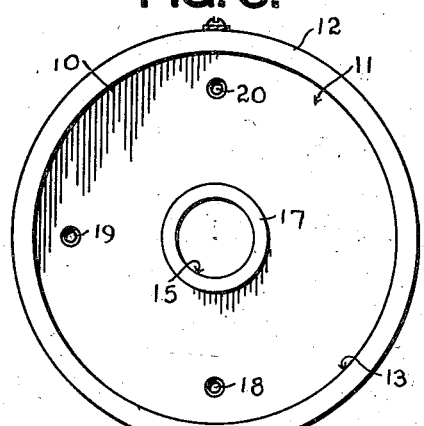
Figure 3 is a plan view of a valve casing therefor.

Extending through the disc 10 are preferably three spaced apart ports 18, 19 and 20 which are spaced equal distances from the axis of the disc 10 and are so arranged that the arcuate distance between the axes of the two farthest apart ports 18 and 20 is substantially 180°. The port 19 is located substantially 90° from either of the other ports. The ports 18, 19 and 20 may be provided with screw threads, throughout a portion of their length, extending from the face 16 of the disc 10 and the disc may also be provided with two pairs of opposed screw threaded sockets 21 extending radially from the periphery of the disc 10 and relatively close adjacent the face 12 as shown in Figure 2. Carried, as by pairs of screws 22 extending into the sockets 21, are a pair of resilient substantially L-shaped members 23 which lie flat against the periphery of the disc 10 at one of their arms and with the opposite arm of each being curved as at 24 and projecting through the plane of the surface 13 and slightly into the seat 11 when the valve is not seated.

The improved disc valve A also includes a valve member comprising a disc 30 adapted to seat in the seat 11. This disc 30 has a bore 31 of lesser diameter than the bore 15 and a collar 32 extending from the outer or exposed face 33 of the disc 30 thru which said bore 31 of course extends. The opposite or inner face 34 of the disc 30 is provided with an annular recess 35 surrounding the bore 31 and accommodating the collar 17. Concentric with the axis of the disc 30 and with the axis of the disc 10 as well, when the valve is seated, is an arcuate groove or channel 36 in the face 34 of the disc 30. The longitudinal medial line of this groove substantially intersects the axis of the ports 18, 19 and 20 when the valve is assembled. The width of this channel is substantially the diameter of any of the ports 18, 19 or 20 and its arcuate length is substantially 180°, so that opposite extremities 37 of the groove 36 will substantially intersect the axes of the ports 18 and 20 at the same time during oscillation of the disc 30. This is well shown particularly in Figure 6. Extending radially thru the collar 32 is a screw threaded opening 38 accommodating a set screw 39 for a purpose later described.

From Figure 2 it will be seen that when the disc 30 is seated, the plane of the face 33 is substantially the same as the plane of the face 12. As a consequence, the arms of the resilient members 23 bear against the face 33 and detachably couple the casing to the valve and hold the valve seated but do not grip the disc 30 tight enough so that it will not be able to oscillate.

From the above it will be seen that the improved valve, exclusive of the resilient members 23, comprises but two portions, easily and inexpensively fashioned, care being exercised, however, that the abutting faces of the two discs 10 and 30 be ground together carefully.

The float assembly B to which, as an example, the improved valve A is shown attached, is of conventional construction and includes a float chamber housing 40 containing a float 41 and from the end of the latter extends a normally horizontal arm 42 thru the length of the chamber 40 and the arm has secured at its end opposite the float a spindle 43, the arm 42 and spindle 43 forming substantially a right angle and the spindle projecting thru the walls of the float chamber housing 40 which housing carries a yoke 44 providing a bearing for the spindle 43 which latter extends forwardly, at the free end, beyond the yoke and to this free end is secured the improved valve A, the set screw 39 securing the disc 30 thereto as shown in Figure 2 while the free end of the spindle projects thru the bore 15 and is free of the walls of the disc 10, also as shown in Figure 2. A bracket 45 may be provided secured as by cap screws 46 to the periphery of the disc 10 and by a bolt 47 to the yoke 44, the bracket 45 having a slot 48 to accommodate the shank of the bolt 47 for adjustably positioning the bracket.

Figure 8:
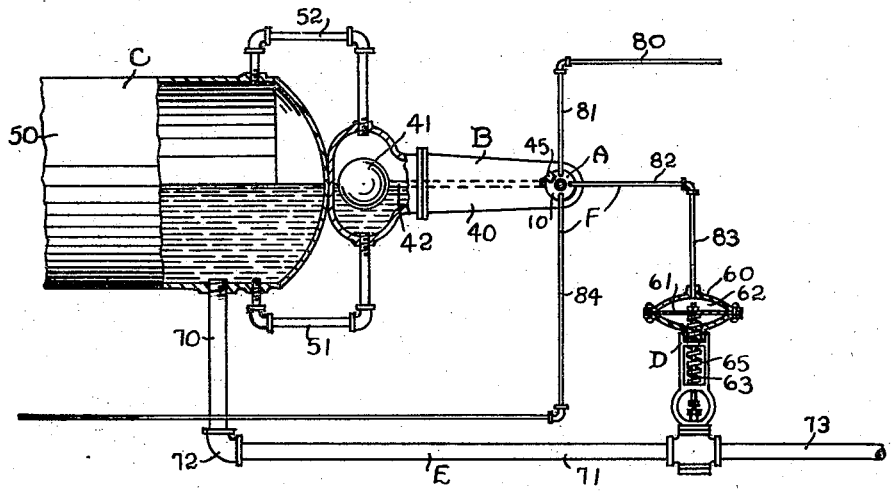
Figure 8 is a view partly in vertical section of apparatus with which the improved valve may be associated.
Figure 9:
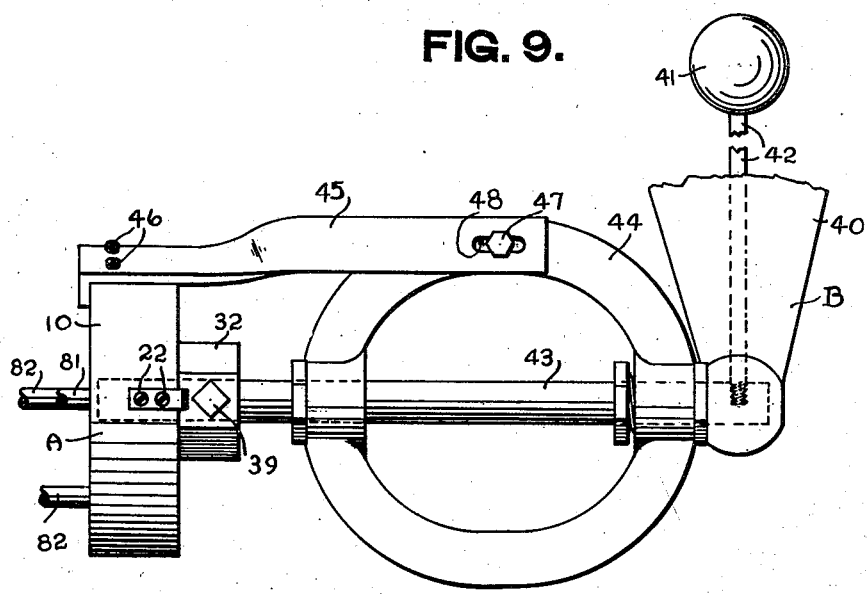
Figure 9 is an enlarged top plan view of the improved valve and showing its association with a portion of the apparatus shown in Figure 8.

The receptacle C may be, as shown in Figure 8, a tank 50 to contain a fluid which should be maintained at a substantially constant level. This tank 50 is provided with a pair of conduits, an inlet conduit 51 and a vent conduit 52, communicating with the interior of the float chamber housing 40 and which permit fluid to flow into and out of the float chamber thereof so that the level of the fluid will be substantially the same in both the tank 50 and float chamber housing 40.

The diaphragm motor valve D is of conventional construction also, and includes a diaphragm housing 60 containing a disc diaphragm 61 above which is a chamber 62 within the housing 60. Attached to the axial center of this diaphragm is a depending plunger 63 for actuating the valve of the diaphragm motor valve and this plunger is encircled by a coil spring 65 supporting the plunger and maintaining the diaphragm in a normally flat horizontal position thruout, thus seating the valve assembly of the diaphragm motor valve. The valve mechanism is not illustrated but the same is of conventional construction as shown in numerous patents, particularly U. S. Patent #1,846,376, dated February 23, 1932.

Extending from the bottom of the tank 50 and in communication with the valve of the diaphragm motor valve is the pipe line E which comprises a downwardly extending section of pipe 70 and a horizontally extending section of pipe 71 connected at one of either of their ends by an elbow 72. The opposite end of the pipe 71 is connected with the housing of the diaphragm motor valve and this pipe 71 of course empties into the housing. The fluid flowing therethru and out of the last mentioned valve housing may pass thereout thru, for instance, another length of pipe 73.

The conduit F preferably comprises pipes 80 and 81 of small bore extending from the source of a suitable pressure medium supply, such medium being in the example shown residual gas from oil distilling operations, and with the end of pipe 81 screw threaded and secured to the valve A by means of the screw threads in the port 20, thus opening into this port. From the port 19 a pipe 82, similar to the pipes 80 and 81 and suitably screw threaded to be attached to the valve A by the screw threads in the port 19, all or a regulated portion of the gas from the valve A is conveyed to the chamber 62 above the diaphragm 61, a second section of pipe 83 being employed as shown. From the port 18 a pipe 84 substantially similar to the pipes 80 to 83, having screw threads at one end for coupling it to the valve A at the screw threaded port 18, conveys all or a regulated portion of the gas to any suitable outlet.

Figure 6:
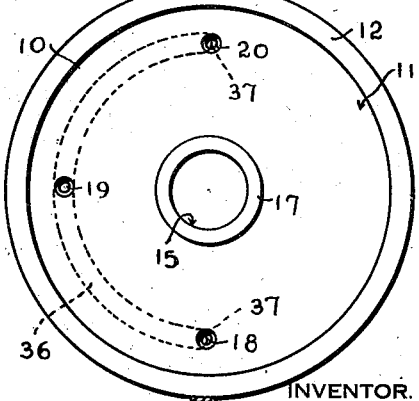

In the use of the improved valve A as shown, the valve should be adjusted so that, when the desired level of fluid in the tank 50 is ascertained, the position of the arcuate groove or channel 36 with respect to the ports 18, 19 and 20 will be substantially as shown in Figure 6 and the valve of the diaphragm motor valve will be substantially one-half open. Thus it will be seen that since the port 20 is partly covered (substantially one-half) only a portion of the volume of gas which may flow thru the port will, in reality, be so flowing and the same volume of gas will be flowing out thru the partly closed (substantially one-half closed) port 18, where it exits so no pressure will be built up in the chamber 62 above the diaphragm 61.

Figure 5:
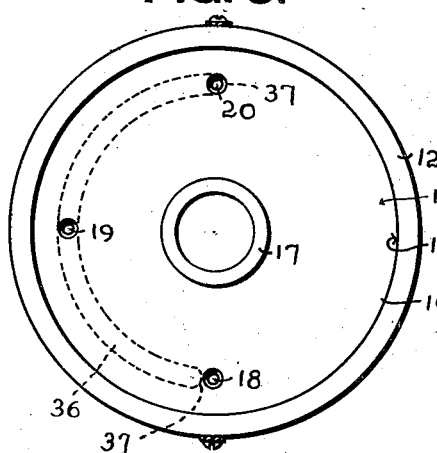
Figures 5, 6 and 7 are views similar to Figure 3 but showing, by dotted lines, various positions with respect to the ports of the arcuate groove or channel as in Figure 4.
Figure 4:
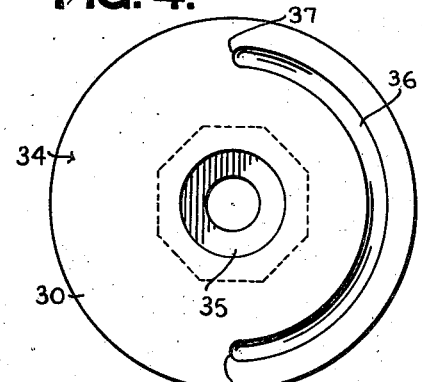
Figure 4 is a plan view of the valve, showing an arcuate groove or channel therein.

However, when circumstances result in the fall of the liquid level in the tank 50, the float 41 will fall, move the inner end of the arm 42 and turn the spindle 43. As a consequence, the groove 36 will take a position as the disc 30 slightly rotates (substantially less than $\frac{1}{16}$") with respect to the ports 18, 19 and 20 as shown in Figure 5. This will result in a full flow of gas thru the port 20 and thru the groove 36 as well as thru the port 19, since the port 18 will be closed. As a consequence, pressure will be built up in the chamber 62 and the diaphragm 61 will be depressed, closing the valve of the diaphragm motor valve. This will stop the flow of fluid from the tank until the liquid level therein again becomes normal. Of course it should be understood that the rotation of the disc 30 need not be enough to wholly open the port 20 nor wholly close the port 18 as shown in Figure 5, but may open the port 20 any fraction more than one-half and consequently close the port 18 any fraction above one-half.

Figure 7:
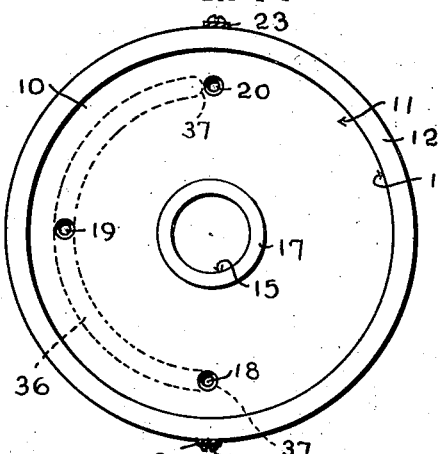

If the liquid level in the tank 50 should rise above normal, the float 41 will rise, move the inner end of the arm 42 upwardly and turn the spindle 43. As a consequence, the groove 36 will take a position, as the disc 30 slightly rotates, with respect to the ports 18 and 19 as shown in Figure 7. This will result in a stoppage of the flow of gas thru the port 20 and wholly open the port 18. As a consequence, pressure will drop in the chamber 62 above the diaphragm 61 since the gas can freely exit from this chamber thru the pipes 83, 82, port 18, groove 36, port 19 and pipe 84. This will result in an upward movement of the diaphragm 61 and consequently an opening of the diaphragm motor valve to such an extent that the flow of fluid from the tank will be increased. However, when this increase has resulted in a lowering of the liquid level to normal, movement of the float will result in the establishment of the condition first described.

The rate of actuation of the novel valve A is very quick, a rotation of the disc 30 of less than 1/8" being all which is required to completely open or close the ports 18 or 20.

The valve will not freeze, for there is a constant flow of gas therethru and the structure is so simple that there is slight possibility of the assembly getting out of order. The assembly is very compact, no piston, no coil spring, nor the like being required and as a consequence the device may be employed in practically all situations, and particularly where it is desirable to have but little space taken up by the valve.

Various changes may be made to the form of invention herein shown and described, without departing from the spirit of the invention or the scope of the claims.

What is claimed is:

1. A disc valve comprising a disc having an annular seat, a second disc in said seat, one of said discs having a plurality of spaced apart ports disposed with their axes at substantially equal distances from the axes of said discs, and the other of said discs having an arcuate groove in one of its faces, said groove being substantially concentric with the axes of said discs and adapted to communicate with various of said ports, said discs having their faces disposed with a face of the second disc exposed at the face of said first disc and with the planes of said last named faces being substantially coincident and resilient means carried by the rim portion of the first named disc and spaced from the axis of said second disc, bearing upon said exposed face to hold said second disc seated.

2. A disc valve comprising a disc having an annular seat, a second disc in said seat, one of said discs having a plurality of spaced apart ports disposed with their axes at substantially equal distances from the axes of said discs, and the other of said discs having an arcuate groove in one of its faces, said groove being substantially concentric with the axes of said discs and adapted to communicate with various of said ports, said discs having a face of the second disc exposed at the face of said first disc and with the planes of said last named faces being substantially coincident, and a substantially L-shaped spring clip secured at one end to the periphery of said first named disc and with its opposite end bearing against the exposed face of said second disc.

3. A disc valve comprising a casing including a stationary disc having an annular seat and a plurality of spaced apart ports disposed with their axes at substantially the same distance from the axis of said disc, a valve in said seat including an oscillating disc having an arcuate groove in one of its faces with said groove substantially concentric with the axes of said discs and adapted to communicate with various of said ports, the opposite face of said oscillating disc being exposed at the face of said stationary disc and with the planes of said last named faces being substantially coincident, and a substantially L-shaped spring clip secured at one end to the periphery of said stationary disc and with its opposite end bearing against the exposed face of said oscillating disc to hold said oscillating disc seated.

4. A disc valve for operative connection with a float assembly including a spindle, comprising a casing including a stationary disc having an annular seat in one face thereof, an opening extending from the opposite face of said seat and spaced apart from and accommodating said spindle, a collar on the seat forming a continuation of the opening and a plurality of spaced apart ports disposed with their axes at substantially the same distance from the axis of said disc; a valve in said seat including an oscillating disc having a bore accommodating said spindle and also having a recess in one face accommodating said collar and an arcuate groove in said last named face with said groove substantially concentric with the axes of said discs and adapted to communicate with various of said ports; means to detachably couple said oscillating disc to said spindle; and resilient means to detachably couple said discs together and permit free oscillation of said oscillating disc.

5. A disc valve for operative connection with a float assembly including a spindle, comprising a casing including a stationary disc having an annular seat in one face thereof, an opening extending from said seat to the opposite face of said disc and accommodating said spindle, and a plurality of spaced apart ports disposed with their axes at substantially the same distance from the axis of said disc; a valve in said seat including an oscillating disc having a bore accommodating said spindle and also having an arcuate groove with said groove substantially concentric with the axes of said discs and adapted to communicate with various of said ports; resilient means spaced from the axes of said discs and from said spindle, to hold said discs in face to face contact during all stages of the operation of said valve; and means to detachably couple said oscillating disc to said spindle.

ISAAC H. GOODMAN.